J. H. Allen.
Loom Temple.

N° 12,236.    Patented Jan. 16, 1855.

UNITED STATES PATENT OFFICE.

JOHN H. ALLEN, OF BIDDEFORD, MAINE.

TEMPLE FOR LOOMS.

Specification of Letters Patent No. 12,236, dated January 16, 1855.

*To all whom it may concern:*

Be it known that I, JOHN H. ALLEN, of Biddeford, in the county of York and State of Maine, have invented a new and useful Improvement in Weavers' Temples; and I do hereby declare that the same is fully described and represented in the following specification and the accompanying drawings, letters, figures, and references thereof.

Figure 1:
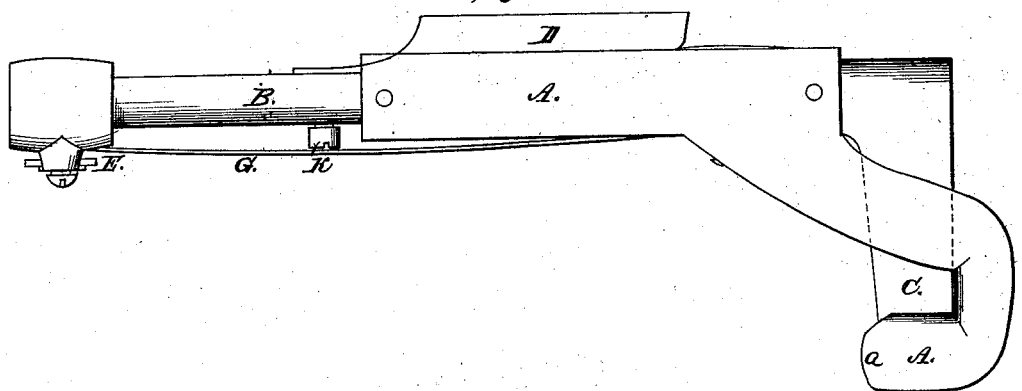
Figure 2:
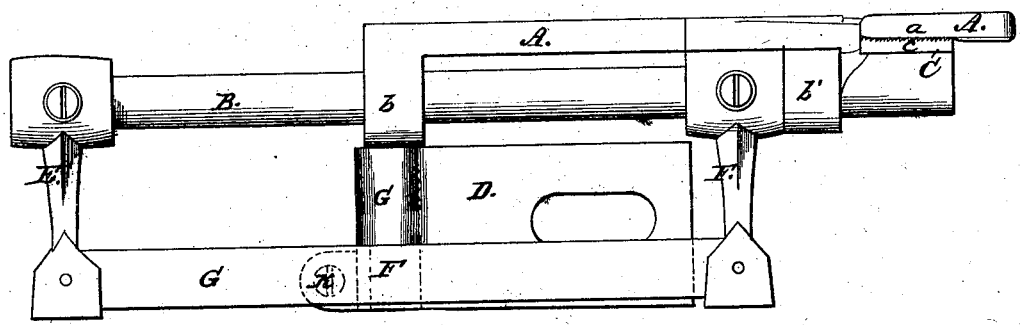
Figure 3:
Figure 4:
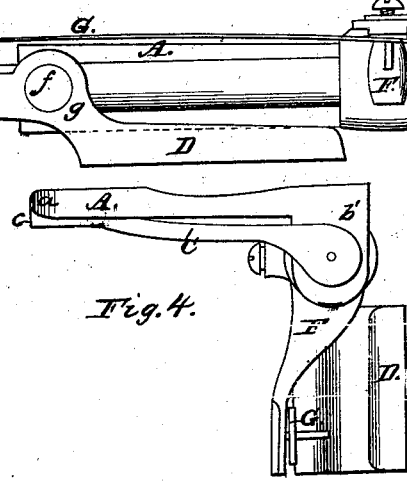

Of the said drawings, Figure 1, exhibits a top view; Fig. 2, a front elevation; Fig. 3, an underside view of my improved jaw temple, and Fig. 4, is an end view of the same.

In the said drawings, A, represents the upper jaw bar of the temple, whose jaw is exhibited at, *a*, the said jaw bar by means of bearings *b*, *b'*, projecting from the underside of it, is made to support the bar, B, of the under jaw or arm, C, whose jaw is shown at, *c*. From that bearing, *b*, which is farthest from the jaw, *c*, a joint pin, *f*, is made to extend downward and to work or to be supported and made to run in a hinge plate D. The joint pin and socket or part on which it turns, I term the joint of the temple, which joint I place about midway between two arms, E, F, which I cause to project downward from the shaft B and to have a straight steel bar spring, G, extended from one to the other and made to rest when in use at its middle against the screw, K, near the joint or socket part, *g*, of the hinge plate, D, as seen in the drawings. The said hinge plate I provide with a projection I, extending from it on that side of the joint which is opposite to that on which the jaws are sitated, and said projection I furnish with a screw K, (or its equivalent) which is, screwed into it and against the spring, G, as seen in Figs. 1, and 3. When the lay beats up it strikes the two arms, E, F, and bears their spring against the screw, and as the arms are made to project beyond the front surface of the spring, the spring will operate with a double action upon the shaft of the lower jaw and in a manner highly conducive to the preservation of the temple or so as to prevent it from getting out of repair and to preserve it in correct operation. Besides this the arrangement of the spring so as to operate on opposite sides of the turning joint, enables me nearly if not entirely to balance the temple and thus prevent it from undue strain upon the cloth.

My improved temple holds the cloth in a very firm manner and keeps it more completely extended than is the case with most other jaw temples in general use, and by reason of its being able to catch the cloth nearer the reel than such temples do, immediately after the temple clasps the cloth, the same spring that closes the jaw operates in a peculiar manner to throw the temple backward and outward thus keeping the cloth fully extended the entire length of the reed, and as will be seen causing the temple to make its greatest draft upon the cloth at a time when the cloth is free from all tension. The temple holds the cloth completely extended until the reed again strikes it, thus entirely preventing any draft of the cloth coming upon the reed, and at the same time leaving the selvage threads free from all outward strain which the reed naturally makes upon them when it is driven forward toward the cloth.

By the peculiar action of temple spring, there is little or no liability of the selvage threads breaking or wearing off, a difficulty which most other kinds of temples are liable to produce. The jaws being made to turn horizontally on a joint as specified allows the temple to swing or vibrate exactly with the cloth. The temple is easily adjusted to operate as the kind of goods or circumstances may require.

By means of the screw, K, any amount of power can be put upon the lower jaw of the temple, that the operator may desire or the will require.

What I claim as my invention is—

Arranging the turning joint of the temple about midway between the ends of the shaft of the inner jaw, in combination with applying the spring G, so that it shall rest at or near its middle against the adjusting screw, K, and at its ends against the two arms from the said shaft, the same enabling me not only to nearly if not entirely balance the temple and prevent it from undue pressure on the cloth, but to obtain from the spring a double action on the shaft or an action on each side of the turning joint, by which advantages in operating the temple, and preserving it in correct operation are attained as specified.

In testimony whereof I have hereunto set my signature this fourteenth day of October A. D. 1854.

JOHN H. ALLEN.

Witnesses:
WM. HAINES,
JABEZ SMITH.